(No Model.)

J. A. ROBERTSON.
PHOTOGRAPHIC SHUTTER.

No. 574,113. Patented Dec. 29, 1896.

Witnesses.

Inventor.
John A. Robertson.
By Geo. B. Selden.
Atty.

UNITED STATES PATENT OFFICE.

JOHN A. ROBERTSON, OF ROCHESTER, NEW YORK.

PHOTOGRAPHIC SHUTTER.

SPECIFICATION forming part of Letters Patent No. 574,113, dated December 29, 1896.

Application filed July 17, 1896. Serial No. 599,477. (No model.)

*To all whom it may concern:*

Be it known that I, JOHN A. ROBERTSON, a citizen of the United States, residing at Rochester, in the county of Monroe, in the State of New York, have invented an Improved Photographic Shutter, of which the following is a specification, reference being had to the accompanying drawings.

My invention relates to an improved photographic shutter whereby the construction of such devices is simplified and cheapened.

My improved shutter is fully described and illustrated in the following specification and the accompanying drawings, the novel features thereof being specified in the claims annexed to the said specification.

Figure 1:
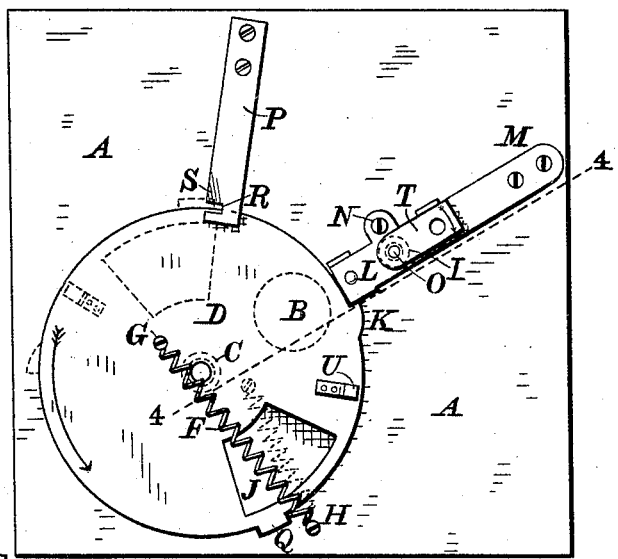
Figure 2:
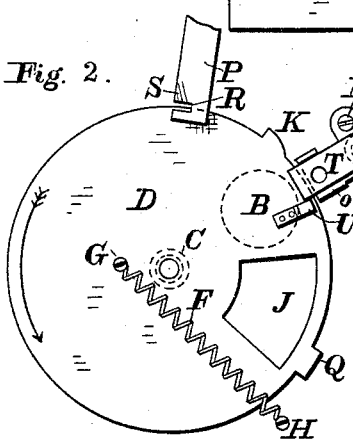
Figure 3:
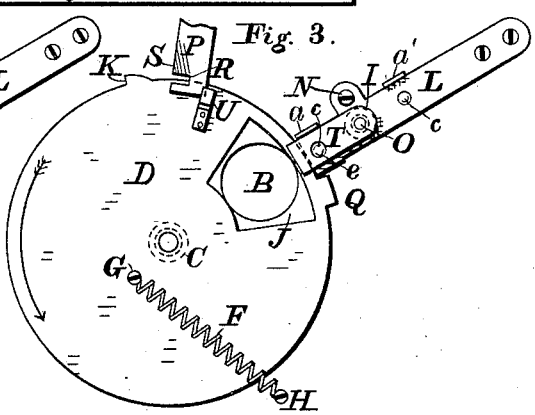
Figure 5:
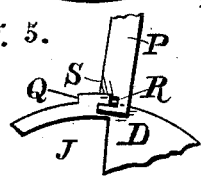
Figure 4:
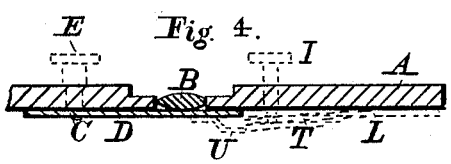
Figure 6:
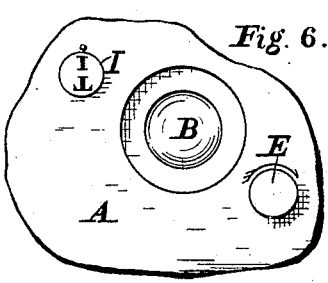

In the accompanying drawings, representing my invention, Figure 1 is a rear elevation of the front of a camera provided with my improved shutter. Fig. 2 is a rear view of the revolving exposure-disk in position just before a time exposure. Fig. 3 represents the revolving exposure-disk during a time exposure. Fig. 4 is a section on the line 4 4, Fig. 1. Fig. 5 represents the device for preventing recoil. Fig. 6 is a partial front elevation of the front.

A represents the front or lens-plate of a camera of any required shape or dimensions. The front is provided with an aperture in which is placed the lens B. The front may be attached to the body of the camera in any suitable manner, being permanently secured thereto, or provided with a rabbet and detachably affixed. The revolving exposing-disk D is pivoted at its center to the rear side of the front on a pivot C, which projects through the front and is provided with a button or milled head E, by which the disk is revolved to set it in the proper positions for the exposures.

F is the spring by which the disk is revolved to make the exposures, and which is pivoted eccentrically at G to the disk and at H to the front. The disk is turned or turns always in the same direction, as indicated by the arrows in the figures, being given a partial rotation by the operator by turning the button E to give the requisite tension to the spring. It will be observed that in the positions shown in Figs. 1, 2, and 3 the spring is strained and exerts a pull on the stud G, which causes the disk to rotate upon being released, which is effected by the operator by pressure on the button I. The disk D is provided with the exposure-opening J, which, as it passes by the lens B, admits the light necessary to make the impression on the sensitive plate. The positions of the spring and disk after the contraction of the spring are indicated by the dotted lines in Fig. 1. Any suitable devices may be used for controlling the movements of the disk and for permitting the exposures. In the arrangement shown the disk is provided with a notch or lug K, which engages with the elastic strip L and holds the disk against the strain of the spring. Pressure on the button I forces the inner end of the strip away from the front, and allows the lug K to pass between it and the front, thereby producing the exposure by the movement of the aperture J across the lens. This produces quick or instantaneous exposures. The strip L is secured at M to the front.

N is a screw inserted in the front and passing freely through an opening in or in a lug on the releasing catch or strip L, and which serves as a guide for the same and to prevent the strip from being pushed inward too far. The shank O of the button I passes through the front and is riveted or otherwise secured to the strip L.

Any suitable device may be used to prevent any recoil in the disk at the end of the movement for instantaneous exposures.

In the construction shown the flexible strap P, secured to the front, bears on the side of the disk near its edge, and a lug Q on the disk passes under the free end of the strap and engages with it, so as to prevent any return movement. A notch R is cut in the side of the strap, and that portion S of the strap outside of the notch is bent toward the front, so that as the lug Q passes under it the strap is bent away from the front slightly, and the lug Q is prevented from recoiling backward under the strap by its engagement with the notch R, as indicated in Fig. 5.

In order to provide for making time exposures, I attach to the catch L the movable detent T, which is secured to the shank O of the button I, so that it can be turned into the inoperative position indicated in Fig. 1 or into the operative position shown in Figs.

2 and 3. When the parts are in the positions shown in Fig. 1, the shutter is changed from instantaneous to time exposures by turning the button I, which interposes the free end of the detent T in the path of the arm U, secured on the disk D. The arm U is bent or offset from the disk, so that when the catch L is pressed inward the arm makes contact with the inner end of the detent T, as indicated in Fig. 2, and arrests the movement of the disk until the pressure on the catch is released. When the arm escapes from the detent, the disk is turned by the spring so as to bring the opening J opposite the lens, in which position the disk is arrested and held by the lug Q striking against the catch L, as indicated in Fig. 3. The exposure thus produced will continue until the operator again presses the detent L inward, allowing the lug Q to pass under the detent and the spring to turn the disk so as to stop the exposure. The length of the exposure is therefore determined by the time which elapses between the pressures given to the button I on the outside of the front. The arm U by its contact with the detent T prevents the movement of the disk and the beginning of the time exposure until the operator has released the first pressure from the button I, when the catch L springs back toward the front and releases the arm U. The button I is marked so as to show whether the shutter is set for instantaneous or time exposures, as indicated in Fig. 6. The disk cannot be turned in the wrong direction. At the same time the proper direction is preferably indicated by an arrow on the front. A hole or indentation $e$, Fig. 3, is made in the detent T, which engages with suitably-located lugs or projections $c$ on the catch L, to secure the detent in either of its positions. Lugs $a\ a'$, Fig. 3, may also be turned up on the edge of the catch L to limit the movements of the detent. A lug $o$, Fig. 2, may be turned inward toward or into the front from the edge of the catch L to afford a wider surface for the lugs K and Q to strike against.

I claim—

1. The combination with the front and lens of a phtographic camera, of the revolving apertured disk D, provided with lugs K and Q, the spring F, eccentrically pivoted at G to the disk, the movable catch L, and the elastic notched strap P, substantially as described.

2. The combination with the front and lens of a photographic camera, of the revolving apertured disk D, provided with lugs K and Q, and arm U the spring F, eccentrically pivoted at G to the disk, the movable catch L, and the detent T, substantially as described.

JOHN A. ROBERTSON.

Witnesses:
 MINER C. WOOD,
 GEO. B. SELDEN.